United States Patent [19]

Meussdoerffer et al.

[11] Patent Number: 4,500,350

[45] Date of Patent: Feb. 19, 1985

[54] DISINTEGRATION OF CHROMITES

[75] Inventors: Johann-Nikolaus Meussdoerffer, Leverkusen; Hans Niederprüm, Monheim; Hans-Georg Nieder-Vahrenholz, Cologne; Wolfgang Bockelmann, Leverkusen, all of Fed. Rep. of Germany

[73] Assignee: Bayer Aktiengesellschaft, Leverkusen, Fed. Rep. of Germany

[21] Appl. No.: 766,414

[22] Filed: Feb. 7, 1977

[30] Foreign Application Priority Data

Feb. 21, 1976 [DE] Fed. Rep. of Germany ..... 26071318

[51] Int. Cl.³ .............................................. C22B 1/02
[52] U.S. Cl. .......................................... 75/1 R; 75/84; 75/21; 423/58; 423/61; 423/118; 423/378
[58] Field of Search ............................ 75/1, 5, 84, 21; 423/58, 61, 118, 378, 566

[56] References Cited

U.S. PATENT DOCUMENTS

| | | | |
|---|---|---|---|
| 3,510,256 | 5/1970 | Shäfer | 423/61 |
| 3,812,234 | 5/1974 | Shafer et al. | 423/61 |
| 3,859,412 | 1/1975 | Okabe et al. | 423/61 |

FOREIGN PATENT DOCUMENTS

| | | | |
|---|---|---|---|
| 28983 | 8/1957 | Finland | 75/1 R |
| 1186439 | 4/1970 | United Kingdom | 423/61 |

OTHER PUBLICATIONS

Udy, M. J., *Chromium*. vol. I, Rheinhold Pub. Corp., p. 265, (1956).

*Primary Examiner*—Michael L. Lewis
*Attorney, Agent, or Firm*—Sprung, Horn, Kramer & Woods

[57] ABSTRACT

In the disintegration of a chromite or chromium-containing residue, wherein the chromium-containing material is disintegrated with an alkaline compound in the presence of oxygen and a diluent at a temperature above about 800° C. and thereafter leached, the improvement which comprises pre-roasting the chromium-containing material prior to addition of the alkaline compound. Pre-roasting can be effected at 400° to 1200° C. with addition of certain amounts of silica dioxide and/or aluminum oxide and such additives, depending on the chromium containing material, if still required, are added—prior to disintegration and leaching—in such a quantity to establish a ratio of $SiO_2$: $Al_2O_3$ of about 2:1 and further a ratio, calculated on the basis of NaOH as the alkaline compound, of $SiO_2$: $Na_2O$ of about 1:0.5 plus a $Cr_2O_3$: $Na_2O$ ratio of about 1:2 to 1:4. Residues from previous leaching cycles can be present during disintegration as solid diluents but their contents of $SiO_2$ and/or $Al_2O_3$ are not taken into account in calculating the $SiO_2$:$Al_2O_3$ ratios. The process gives excellent results even with starting materials relatively high in $SiO_2$ which are difficult to disintegrate to materials of desirable properties by other methods.

7 Claims, No Drawings

DISINTEGRATION OF CHROMITES

This invention relates to a new process for the disintegration of chromites with alkali compounds in the presence of atmospheric oxygen and solid diluents which enables the chromium content of, in particular, ores rich in magnesium oxide and silicon dioxide and chemical low grade ores with a high gangue content to be converted into water-soluble alkali chromate (VI) to a much greater extent than is the case with conventional disintegration processes.

In the conventional chromite disintegration process, the finely powdered ore, which apart from small quantities of $SiO_2$-containing gangue, essentially contains isomorphous mixed crystals of the spinel series corresponding to the general formula $(Fe^{II}, Mg) (Cr, Al, Fe^{III})_2O_4$, is disintegrated with soda and/or sodium hydroxide at temperatures of from 900° to 1200° C. in rotating shelf, annular hearth or revolving tubular furnaces in the presence of atmospheric oxygen and diluents or oxidizing agents to form water-soluble chromate.

Iron oxides (cinders) and/or leaching residues from a preceding ore disintegration cycle (so-called back ore) are generally used as inert diluents, the quantites required being essentially determined by the type of furnace used (Ullmanns Encyklopadie, IIIrd Edition, Vol. 5 (1954), page 572). On account of the formation of substantially insoluble calcium chromate, the hitherto standard addition of lime or dolomite is now virtually obsolete, although these additives have the advantage of being able to bind the acid constituents of the ore, for example $SiO_2$ or $Al_2O_3$ (cf. Gmelin, 8th Edition, Vol. 52, part A/1 (1962), pages 197 et seq and 200 et seq).

One disadvantage of this chromite disintegration process is that, even in the dissociation of a "chemical-grade" chromite, which contains approximately 45% of $Cr_2O_3$, the yield of water-soluble chromate amounts to only 75 to 85%, i.e. up to one quarter of the chromium present in the ore is not disintegrated, but remains in the leaching residue.

This situation is made even more difficult by the increasing shortage of raw materials for the manufacture of dichromate, especially chemical-grade chromites (chemical grade=high-iron chromite according to the nomenclature of the US Bureau of Mines, cf. Ullmanns Encyklopadie, IVth Edition, (1975), Vol. 9, page 606), so that improved disintegration processes are of considerable importance.

A chemical-grade chromite normally used (from Transvaal, South Africa) has the following composition for example:

44.5% of $Cr_2O_3$, 26.4% of FeO, 14.4% of $Al_2O_3$, 10.6% of MgO, 3.5% of $SiO_2$.

The silica content (from minerals of the gangue) is one of the reasons why, in the conventional chromite disintegration process, the chromium present in the ore is not completely disintegrated, but remains in the leaching residue in the form of $Cr_2O_3$.

The unfavorable effect which $SiO_2$ has upon the degree of disintegration is attributable not only to the already mentioned ready bonding of alkali (cf. P. Dilthey and J. Weise, Winnacker-Kuchler, Chemische Technologie, C. Hanser-Verlag Munich, Vol. 2 (1970) page 88), which is then no longer available for the formation of alkali chromate, but also to the preferential formation of alkali silicates from the gangue during the disintegration reaction before the extremely stable spinel lattice is attacked.

However on account of the low melting point of the sodium silicate formed (the melting point of pure $Na_2SiO_3$ is 1088° C.), disintegration is thus incomplete because oxygen is no longer able to diffuse adequately into the disintegration mixture. If the quantity of alkali added is increased, other elements in the ore, especially the $Al_2O_3$, are co-disintegrated, and the working up of aluminate-containing chromate solutions involves considerable difficulties, especially when it comes to filtration (cf. German Offenlegungsschrift No. 2,365,271, page 4).

Accordingly, chemical chromites should contain only 3% up to at most 5% of $SiO_2$ (cf. US Stockpile Specification, W. Gocht, Handbuch der Metallmarkte, Springer-Verlag 1974, page 89).

In view of the increasing shortage of raw materials for the manufacture of dichromate, especially chemical-grade chromites, it is desirable to increase the yield of chromate and in addition to be able to use ores rich in $SiO_2$ as well, for example metallurgical-grade or refractory-grade ores, metallurgical-grade ores containing up to about 8% of $SiO_2$ and refractory-grade ores up to 6% of $SiO_2$.

In addition to the $SiO_2$ content, the MgO content of the ores in the spinel lattice of the chromite plays a part in reducing yield, especially the volume time yield, because the kinetics of the disintegration process are adversely affected in this way. Accordingly, ores with a relatively high $MgO.Cr_2O_3$ content (magnesiochromite) have hitherto frequently been rejected by the chemical industry (cf. Dilthey and Weise, Loc. cit., page 87). However, there are particularly metallurgical-grade ores which have a high MgO content, for example up to about 20% and, in extreme cases, more than about 30% and, in that case, correspondingly less FeO.

Accordingly, the object of the present invention is to provide a commercially workable process which enables the available chromites and, in particular, chromites rich in MgO and $SiO_2$ and low-grade ores (ores with very low chromium contents) with a very high proportion of gangue to be better utilized.

Accordingly, the present invention provides a process for the disintegration of chromites and/or chromium-containing residues which is characterized by the fact that the chromium-containing material is first pre-roasted, optionally in the presence of additives, and is then disintegrated with alkali compounds in the presence of oxygen and diluents at temperatures above about 800° C.

It has been found that the yield of the subsequent alkaline-oxidizing disintegration of chromites can be considerably increased and that, in particular, it is even possible to use metallurgical grade or refractory grade ores with high MgO and/or $SiO_2$ contents or low grade chromium ores for the chemical or disintegration process, providing these ores are initially treated with additives in the absence of alkali in a pre-roasting operation carried out at elevated temperatures. The additives used for decomposing the spinel lattice are $SiO_2$ or $Al_2O_3$ or any materials of the type which contain or are able to form silica and/or aluminum oxide. The additives are added to the ores or chromium-containing residues to be disintegrated or to mixtures thereof, to establish a ratio of $SiO_2$ to $Al_2O_3$ of up to about 2:1, e.g. about 1,5-2:1. The $SiO_2$ already present in the ore from the gangue has to be taken into consideration, so that in some cases less $SiO_2$ or, in the extreme case, no $SiO_2$ at all, but instead $Al_2O_3$ has to be added. It is only the quantity of $Al_2O_3$ and $SiO_2$ already present in the ore which is taken into consideration, not the quantity in the so-called leaching residue where it is already present largely in the form of sodium aluminosilicate ($Na_2O.Al_2O_3.2SiO_2$).

In view of the desired ratio of $SiO_2$ to $Al_2O_3$, the $SiO_2$ should if possible not be used in a larger excess than corresponds to the $SiO_2:Al_2O_3$ ratio of 2:1, although a small excess of $Al_2O_3$ is harmless.

The chromate liquor has to be purified in cases where the subsequent disintegration process is carried out with relatively large overstoichiometric quantities of alkali. Aluminum-containing or silicon-containing compounds are purified by the hydrothermal precipitation of alkali aluminosilicate corresponding to the general formula $nMe_2O.mSiO_2.nAl_2O_3.xH_2O$, n and m being integers or fractions of from 0.8 to 1.2 and from 1.3 to 4.3, respectively, and x being the degree of hydration. Me represents an alkali metal and/or alkaline earth metal which may also occur in admixture and may also be partly replaced by hydrogen. Precipitation is carried out by heating the solution to temperatures above about 30° C. preferably to temperatures above about 60° C., and preferably under normal pressure. Materials containing aluminum oxide or silicon oxide are used as precipitants in such a quantity that an $SiO_2:Al_2O_3$ ratio of about 0.8:1 to 5:1 is adjusted in the crude chromate liquor.

The roasting operation described above is carried out at temperatures in the range from about 400° C. to 1200° C. which correspond to those of the actual disintegration process and to an extent are even considerably lower.

It is surprisingly possible by this thermal pretreatment to modify the spinel lattice of the chromite to such an extent that, in the case of metallurgical ores and low grade ores, yields of up to about 95% are obtained in the subsequent alkaline-oxidizing disintegration process without, for example, troublesome clinker formation or caking being encountered in the furnace. So far as the quantity of alkali to be added is concerned, a ratio of $Cr_2O_3$ to $Na_2O$ of about 1:2 to 1:4 is desirable and, moreover, such a quantity of alkali is additionally added that a ratio of $Na_2O$ to $SiO_2$ of around 1:2 is obtained.

It is remarkable that solid-phase reactions which lead to an irreversible change in the structure of the chromite (the exact reaction mechanism is not yet known) actually take place at a temperature far below the melting temperature of the magnesiochromite (approximately 2000° C.) and chromite (approximately 1545° C.-1730° C.).

In another embodiment, the pre-roasted chromite mixture is separated before the actual alkaline-oxidizing disintegration ation reaction by physical or mechanical methods, for example by gravity separation or flotation, into a fraction rich in $Cr_2O_3$, which is then subjected to conventional alkaline oxidizing disintegration, and a synthetically produced fraction rich in gangue.

This variant of the process is of advantage in cases where separation, including the losses of chromium, is more economical than consumption of alkali in the direct further processing of the pre-roasted chromite mixture, because in that case correspondingly less alkali remains in the end chromite sludge in the form of insoluble sodium aluminumsilicate.

The $SiO_2$-containing component used in the pre-roasting operation is, for example, finely ground quartz or any other material of high silicon content, although by virtue of their increased reactivity it is advantageous to use precipitated silicas, including those from the working up of $H_2SiF_6$ such as are obtained in industry (German Offenlegungsschrift No. 2,347,485).

The $Al_2O_3$ component is, for example, aluminum oxide itself, bauxites or other materials of high aluminum oxide content.

In addition to chromites of different origin, leaching residues from conventional disintegration processes are also used as the chromium-containing residues.

Various types of furnaces, for example revolving tubular furnaces, rotating shelf furnaces, annular hearth furnaces or fluidized bed furnaces and shaft furnaces, may be used as the preheating unit. In the latter case, however, the specific gravities of the chromium-containing materials used and of the $SiO_2/Al_2O_3$-containing additives should not be too different because otherwise separation and discharge may occur. In this case, the mixture to be roasted should if necessary be granulated beforehand.

The invention is illustrated by the following Examples:

EXAMPLE I (1) Comparison Example

A mixture of 100 parts of a metallurgical-grade chromite (composition: 48.2% of $Cr_2O_3$, 15.6% of $Fe_2O_3$, 8.1% of $Al_2O_3$, 7.0% of $SiO_2$, 19.5% of MgO and traces of CaO, $TiO_2$ and vanadium), 67.2 parts of soda (100% based on $Cr_2O_3$), 180 parts of a leaching residue from a preceding conventional chromite dissociation process containing 13.1% of $Cr_2O_3$ and 15 parts of cinders, was calcined for 2 hours at 1080° C. in the presence of air in an electrically heated muffle furnace.

Leaching of 100 parts of this disintegrated material with 500 parts of water gave $Na_2CrO_4$ in a yield of 67%. However, the chromate liquor still contained 1.2% of free NaOH, 0.5% of Al and 0.1% of $SiO_2$, based in each case on 100 parts of the reaction mixture.

The leaching residue still contained 15.3% of $Cr_2O_3$. Application of this disintegration reaction to industrial units, for example revolving tubular furnaces, is only possible with some difficulty because, in view of the high $SiO_2$ content, low-melting alkali silicates can give rise to a reduction in yield and also to caking in the furnace.

(2) According to the process of the invention, 100 parts of chromite with the above composition were thoroughly mixed with 2.51 parts of $SiO_2$, produced from $H_2SiF_6$, followed by calcination for 2 hours at 1080° C. in an electrically heated muffle furnace.

After additional $SiO_2$ had been added, an $SiO_2:Al_2O_3$ ratio of approximately 2:1 was reached in the mixture. After cooling, the ore thus pretreated was mixed with 76 parts of soda (113%, based on $Cr_2O_3$), 180 parts of leaching residue 13.1% of $Cr_2O_3$) and 15 parts of cinders. 200 parts of this mixture were then calcined for 2 hours at 1080° C. in the presence of air in an electrically heated muffle furnace. Leaching gave 44.8 parts of $Na_2CrO_4$, corresponding to a yield of 81% based on the chromite used. The $Cr_2O_3$ content of the leaching residue moderated to 12.6%. The soda excess of 13%, based on $Cr_2O_3$, was necessary for forming compounds with the composition $Na_2O.Al_2O_3.SiO_2$, so that no excess of alkali was present for the actual disintegration reaction.

Despite the relatively large quantity of soda, the chromate liquor contained only 0.4% of NaOH, 0.1% of Al and 0.1% of $SiO_2$, based on 100 g of reaction mixture.

EXAMPLE II (1) Comparison Example

A mixture of 100 parts of a silica-rich chromite (composition: 40.8% of $Cr_2O_3$, 17.35% of $Fe_2O_3$, 11.6% of $Al_2O_3$, 10.7% of $SiO_2$, 16.7% of MgO and traces of CaO, $TiO_2$ and Vanadium), 57 parts of soda (100% based on $Cr_2O_3$ in the fine ore), 180 parts of leaching residue (containing 13.1% of $Cr_2O_3$) from a preceding conventional chromite disintegration process and 15 parts of cinders, was calcined for 2 hours at 1080° C. in the presence of air in a muffle furnace. Leaching with 500 parts of water gave $Na_2CrO_4$ in a yield of 75.8%, based on $Cr_2O_3$ in the fine ore. The leaching residue still contained 12.7% of $Cr_2O_3$. The chromate liquor additionally contained 0.1% of NaOH, 0.05% of Al and 0.04% of $SiO_2$, based on 100 parts of melt.

In view of this high $SiO_2$ content of the ore, it would not appear to be possible to carry out this disintegration reaction on a commercial scale in revolving tubular furnaces under other comparable conditions and still to obtain the yields indicated.

(2) According to the process of the invention, 100 parts of chromite with the above compositions were mixed with 2.95 parts of $SiO_2$, produced from $H_2SiF_6$, and calcined for 2 hours at 1080° C. in a muffle furnace. A total $SiO_2:Al_2O_3$ ratio of approximately 2:1 was achieved by the addition of further $SiO_2$. After cooling, the ore thus pre-roasted was mixed with 69 parts of soda (121% based on the $Cr_2O_3$ in the fine ore), 180 parts of leaching residue from a preceding conventional chromite disintegration (containing 13.1% of $Cr_2O_3$) and 15 parts of cinders, followed by calcination for 2 hours at 1080° C. in the presence of air in a muffle furnace.

Leaching gave $Na_2CrO_4$ in a yield of 91%, based on the $Cr_2O_3$ in the fine ore. The leaching residue still contained 10.7% of $Cr_2O_3$.

The soda excess of 21% corresponded to that quantity of alkali which was necessary for adjusting the $Na_2O:Al_2O_3:SiO_2$ ratio of 1:1:2, i.e., no excess for the disintegration of $Cr_2O_3$.

Despite the large quantity of alkali used, the chromate liquor obtained only contained 0.1% of NaOH, 0.07% of Al and 0.1% of $SiO_2$, based on 100 g of reaction mixture.

EXAMPLE III (1) Comparison Example 100 parts of chromite (low grade ore of high gangue content) with the composition: 33.8% of $Cr_2O_3$, 12.1% of $Fe_2O_3$, 6.6% of $Al_2O_3$, 14.4% of $SiO_2$, 18.0% of MgO and traces of CaO, $TiO_2$ and vanadium), 47 parts of soda (100% of the theoretical amount, based on the $Cr_2O_3$ content), 180 parts of leaching residue from a preceding disintegration cycle containing 13.1% of $Cr_2O_3$ and 15 parts of cinders, were calcined for 2 hours at 1080° C. in the presence of air in a muffle furnace. Leaching gave $Na_2CrO_4$ in a yield of 63.3%, based on the $Cr_2O_3$ in the fine ore. The leaching residue still contained 13.5% of $Cr_2O_3$.

(2) According to the process of the invention, 100 parts of chromite with the above-mentioned composition were mixed with 5.64 parts of aluminum oxide, followed by calcination for 2 hours at 1080° C. in a muffle furnace. A total $SiO_2:Al_2O_3$ ratio of approximately 2:1 was reached in the mixture by the addition of more $Al_2O_3$.

After cooling, the ore pretreated with $Al_2O_3$ was mixed with 60 parts of soda (130.4% of the theoretical amount based on the $Cr_2O_3$ in the fine ore), 180 parts of leaching residue from a preceding conventional disintegration cycle (containing 13.1% of $Cr_2O_3$) and 15 parts of cinders, followed by calcination for 2 hours at 1080° C. in the presence of air in a muffle furnace. Leaching gave $Na_2CrO_4$ in a yield of 95%, based on the $Cr_2O_3$ in the fine ore. The leaching residue still contained 9.7% of $Cr_2O_3$. The soda excess of 30.4% was necessary for adjusting the $Na_2O:Al_2O_3:SiO_2$ ratio of about 1:1:2, i.e. no excess of alkali for disintegration of the $Cr_2O_3$. Despite the large quantity of alkali used, the chromate liquor only contained 0.5% of NaOH and was free from aluminum.

EXAMPLE IV (1) Comparison Example

A mixture of 100 parts of a metallurgical chromite (composition: 49.7% of $Cr_2O_3$, 14.9% of $Fe_2O_3$, 16.7% of $Al_2O_3$, 2.3% of $SiO_2$, 15.9% of MgO and traces of CaO, $TiO_2$ and vanadium), 69 parts of soda (100% of the theoretical amount, based on the $Cr_2O_3$ in the fine ore), 180 parts of leaching residue (13.1% of $Cr_2O_3$) from a preceding conventional chromite disintegration process and 15 parts of cinders was calcined for 2 hours at 1080° C. in the presence of air in a muffle furnace. Leaching gave $Na_2CrO_4$ in a yield of 74.5%, based on the $Cr_2O_3$ in the fine ore. The leaching residue contained 14.3% of $Cr_2O_3$. The chromate liquor still contained 0.3% of NaOH, based on 100 parts of the disintegration mixture.

(2) According to the process of the invention, 100 parts of chromite with the above-mentioned composition were mixed with 17.4 parts of $SiO_2$, followed by calcination for 2 hours at 1080° C. in a muffle furnace. An $SiO_2:Al_2O_3$ ratio of 2:1 was achieved by the addition of more $SiO_2$.

After cooling, the ore thus pretreated with $SiO_2$ was mixed with 87 parts of soda (126.1% of the theoretical amount, based on the $Cr_2O_3$ used), 180 parts of leaching residue from a preceding conventional chromite disintegration process (containing 13.1% of $Cr_2O_3$) and 15 parts of cinders, followed by calcination for 2 hours at 1080° C. in the presence of air in a muffle furnace. Leaching with water gave $Na_2CrO_4$ in a yield of 95.1% of the theoretical yield based on the fine ore used, and a leaching residue containing 10.1% of $Cr_2O_3$.

The soda excess of 26.1% was again merely used for adjusting the $Na_2O:Al_2O_3:SiO_2$ ratio of about 1:1:2, i.e. no excess of alkali for the disintegration of $Cr_2O_3$.

The chromate liquor obtained was free from aluminum and only contained about 0.4% of NaOH, despite the relatively large quantity of soda used.

EXAMPLE V (1) Comparison Example

A mixture of 100 parts of a chemical-grade chromite with a high $SiO_2$ content (composition: 45.0% of $Cr_2O_3$, 21.0% of $Fe_2O_3$, 13.7% of $Al_2O_3$:7.3% of $SiO_2$, 9.6% of MgO and traces of CaO, $TiO_2$ and vanadium), 63 parts of soda (100% of the theoretical amount based on the $Cr_2O_3$ in the fine ore), 180 parts of leaching residue (13.1% of $Cr_2O_3$) from a preceding conventional chromite disintegration process and 15 parts of cinders, was calcined for 2 hours at 1080° C. in the presence of air in a muffle furnace. Leaching with water gave $Na_2CrO_4$ in a yield of 79.3%, based on the $Cr_2O_3$ in the fine ore.

The leaching residue still contained 12.8% of $Cr_2O_3$. The chromite liquor still contained 0.06% of NaOH and 0.06% of Al, based on 100 parts of reaction mixture used.

(2) According to the process of the invention, 100 parts of the above-mentioned chromite were mixed with 8.8 parts of $SiO_2$, followed by pre-roasting for 2 hours at 1080° C. in a muffle furnace. The addition of more $SiO_2$ gave a ratio of $SiO_2:Al_2O_3$ of about 2:1. After this mixture had been cooled, the pre-roasted chromite was mixed with 77 parts of soda (122.2% of the theoretical amount based on $Cr_2O_3$ in the fine ore), 180 parts of leaching residue from a preceding conventional chromite disintegration process (containing 13.1% of $Cr_2O_3$) and 15 parts of cinders, followed by calcination for 2 hours at 1080° C. in the presence of air. Leaching gave $Na_2CrO_4$ in a yield of 88% of the theoretical yield based on $Cr_2O_3$ in the fine ore, and a leaching residue containing 11.3% of $Cr_2O_3$.

The soda excess of 22.2% corresponded to that quantity which was necessary for adjusting an $Na_2O:Al_2O_3:SiO_2$ ratio of about 1:1:2. Despite the relatively large quantity of soda in absolute terms, the chromate liquor only contained 0.16% of NaOH and 0.06% of Al, based on 100 parts of reaction mixture.

EXAMPLE VI 100 parts of a metallurgical chromite (48.2% of $Cr_2O_3$, 15.6% of $Fe_2O_3$, 7.0% of $SiO_2$, 8.1% of $Al_2O_3$, 19.5% of MgO) were mixed with 134.45 parts of soda (200% of the theoretical, based on $Cr_2O_3$), and 195 parts of $Fe_2O_3$ (as diluent), followed by calcination for 2 hours at 1100° C. $Na_2CrO_4$ could only be obtained therefrom in a yield of 69.8% of the theoretical yield, based on the total quantity of $Cr_2O_3$ present, the chromate liquor still containing 0.07% of $SiO_2$, 14.48% of NaOH and 0.58% of Al.

EXAMPLE VII 100 parts of a metallurgical chromite (same composition as in Example VI) were mixed with 201.7 parts of soda (300% of the theoretical, based on $Cr_2O_3$ in the fine ore) and 195 parts of cinders (as diluent), followed by calcination for 2 hours at 1100° C. Of the total amount of $Cr_2O_3$ originally present, 86.0% were recovered in the form of $Na_2CrO_4$, although the chromate liquor still contained 21.68% of free NaOH and 0.78% of Al which had additionally to be separated off again.

EXAMPLE VIII (according to the invention)

100 parts of a metallurgical-guide chromite (composition: 41.7% of $Cr_2O_3$, 15.9% of $Fe_2O_3$, 19.9% of $Al_2O_3$, 4.1% of $SiO_2$ and 17.6% of MgO, also traces of CaO, $TiO_2$ and vanadium compounds) were mixed with 19.3 parts of $SiO_2$, produced from commercial-grade $H_2SiF_6$, followed by calcination for 2 hours at 1000° C. in the absence of alkali. The addition of more $SiO_2$ brought the ratio of $SiO_2:Al_2O_3$ in the mixture to about 2:1.

After cooling, grinding and sifting to a grain size of 50μ, the mixture of fine ore and $SiO_2$ thus pretreated was worked up in a laboratory shaking table. The parameters, such as stroke, transverse and longitudinal inclination, liquid-solids ratio, crossflow water volume and the like, for preparing these mixtures on the shaking table, were each best determined in a preliminary test.

A $Cr_2O_3$-rich fraction (concentrate) and a $Cr_2O_3$-poor fraction (so-called synthetic gangue) were obtained by this method. The total dried $Cr_2O_3$-containing concentrate (79.8 parts, 45.9% of $Cr_2O_3$) was then mixed with 51.1 parts of soda (100% of the theoretical amount) and, for dilution with 117 parts of leaching residue (13.1% of $Cr_2O_3$) from a preceding standard chromite disintegration process and with 10 parts of cinders, followed by calcination for 2 hours at 1100° C. in the presence of air.

Leaching gave 75.3 parts of sodium chromate (84.7% yield, based on the total amount of $Cr_2O_3$ present in the untreated fine ore, and 96.5% based on the concentrate used).

In the foregoing specification and throughout the specification and claims, parts are by weight unless otherwise expressed.

What is claimed is:

1. In the disintegration of a chromite or chromium containing residue, wherein the chromium-containing material is disintegrated with an alkaline compound in the presence of oxygen and a diluent at a temperature above about 800° C. and thereafter leached, the improvements which comprise employing as said chromium-containing material a chromite selected from the group consisting of gangue-rich chemical grade chromite, metallurgical-grade chromite and refractory-grade chromite, and pre-roasting the chromium-containing material for about 2 hours at 1000° to 1100° C. whereby upon subsequent disintegration and leaching there is obtained a higher yield of chromium.

2. A process as claimed in claim 1, wherein to the chromium-containing material prior to pre-roasting there is added an additive material which contains or is able to form at least one of silicon oxide and aluminum oxide.

3. A process as claimed in claim 1, wherein an additive is added to the chromium-containing material to bring the molar ratio of $SiO_2:Al_2O_3$ in the mixture to about 1.5–2:1.

4. A process as claimed in claim 1, wherein the pre-roasted material is subjected to a physical or mechanical separation, and only the fraction richer in chromium is subjected to the alkaline-oxidizing disintegration reaction.

5. A process as claimed in claim 1, wherein to the pre-roasted material the alkaline compound is added in such a quantity to establish a ratio, calculated on the basis of NaOH as the alkaline compound, of $SiO_2:Na_2O$ of about 1:0.5 plus a $Cr_2O_3:Na_2O$ ratio of about 1:2 to 1:4.

6. A process as claimed in claim 1, wherein the chromite used is a metallurgical-grade chromite.

7. A process as claimed in claim 1, wherein the chromite used is a refractory-grade chromite.

* * * * *